US006798543B1

(12) United States Patent
Feng

(10) Patent No.: US 6,798,543 B1
(45) Date of Patent: Sep. 28, 2004

(54) METHOD AND APPARATUS FOR COMPRESSION AND DECOMPRESSION OF HALFTONED IMAGES

(75) Inventor: Xiao-fan Feng, Vancouver, WA (US)

(73) Assignee: Sharp Laboratories of America Inc., Camas, WA (US)

( * ) Notice: Subject to any disclaimer, the term of this patent is extended or adjusted under 35 U.S.C. 154(b) by 954 days.

(21) Appl. No.: 09/660,754

(22) Filed: Sep. 13, 2000

(51) Int. Cl.[7] .......................... G06K 15/00; G06K 9/36

(52) U.S. Cl. ...................... 358/3.06; 382/238; 382/253

(58) Field of Search ............................... 382/232, 235, 382/238, 237, 244, 251, 253; 358/2.99, 3.3, 3.06, 426.14

(56) References Cited

U.S. PATENT DOCUMENTS

| | | | | | |
|---|---|---|---|---|---|
| 4,193,096 | A | | 3/1980 | Stoffel | 358/260 |
| 4,425,582 | A | | 1/1984 | Kadakia et al. | 358/260 |
| 4,435,726 | A | | 3/1984 | Liao | 358/135 |
| 4,475,127 | A | | 10/1984 | Iinuma | 358/260 |
| 4,633,325 | A | * | 12/1986 | Usubuchi | 358/260 |
| 4,760,460 | A | | 7/1988 | Shimotohno | 358/261 |
| 4,786,975 | A | | 11/1988 | Postl | 358/283 |
| 4,922,273 | A | | 5/1990 | Yonekawa et al. | 358/429 |
| 4,965,677 | A | | 10/1990 | Pennebaker et al. | 358/429 |
| 5,177,622 | A | | 1/1993 | Yoshida et al. | 358/429 |
| 5,253,936 | A | | 10/1993 | Ishida | 358/427 |
| 5,469,268 | A | * | 11/1995 | Neuhoff | 358/298 |
| 5,491,564 | A | | 2/1996 | Hongu | 358/429 |
| 5,682,209 | A | * | 10/1997 | Borgwardt | 348/699 |
| 5,699,102 | A | | 12/1997 | Ng et al. | 347/224 |
| 5,852,742 | A | | 12/1998 | Vondran, Jr. et al. | 395/800.28 |
| 5,859,931 | A | | 1/1999 | Fan et al. | 382/238 |
| 6,141,450 | A | * | 10/2000 | Chen | 382/237 |
| 6,330,076 | B1 | * | 12/2001 | Imaizumi et al. | 358/1.9 |
| 6,538,771 | B1 | * | 3/2003 | Sakatani et al. | 358/2.1 |

FOREIGN PATENT DOCUMENTS

| | | | | |
|---|---|---|---|---|
| EP | 0773688 | * | 5/1997 | H04N/7/26 |
| JP | 01-027369 | | 1/1989 | H04N/1/41 |

* cited by examiner

*Primary Examiner*—Jerome Grant, II
(74) *Attorney, Agent, or Firm*—Marger Johnson & McCollom PC

(57) ABSTRACT

A method for compression and decompression of halftoned images using the halftone screen. The method reduces an input binary image into a mean image, uses the halftone screen in combination with the mean image to produce a predicted image. The predicted image is then compared to the original image to produce a residue image. The residue image and the mean image are then compressed and either stored or transmitted. For decompression, the mean image and residue image are decompressed and then used with the halftone screen to arrive at a reconstructed binary image. A prediction process uses the mean image and scales it to a full-size image that has substantially similar dimensions as the original image. It then applies the halftone screen to the full-size image and produces a predicted image.

12 Claims, 3 Drawing Sheets

METHOD AND APPARATUS FOR COMPRESSION AND DECOMPRESSION OF HALFTONED IMAGES

BACKGROUND

1. Field

This disclosure relates to compression of halftoned images, more particularly to a method and system that use the halftone screen and image statistics to predict the binary pattern.

2. Background

Digital printers render images and text by producing dots of ink of color, one color in a monochrome system or several colors in a color system. The human eye blurs these dots together, which produces the images 'seen' by the brain. Images of continuous tone (contone) such as photographs do not have dots in them, so they must be converted using a process referred to as halftoning. Halftoning produces the mix of dot values that the eye will interpret as contone images.

Halftoning is performed by applying a screen to the image, breaking it into a series of dots. Recently, frequency modulation (FM) or blue noise screens have been applied to images. They result in pleasing halftoning results, with smooth tone scale and computational simplicity. However, they can result in some problems when compressing halftone images.

For example, U.S. Pat. No. 4,193,096, issued Mar. 11, 1980, discloses a method for encoding and decoding a half-tone image. However, the compression relies upon a correlation between quadrants of the image, and the quadrants are very small. FM screens tend to be too large for techniques such as this, as well as having the effect of decorrelating the data. This will make any predictions based upon neighboring pixels or regions of the image inaccurate.

Similarly, U.S. Pat. No. 4,760,460, issued Jul. 26, 1988, discloses a method for transmission of halftone images. This method relies upon a dither matrix of 16 levels and requires some spatial correlation in order to function effectively. Most FM or blue noise screens have 256 levels, making this inadequate for images to which these screens are applied. Additionally, the random nature of these screens also limits any spatial correlation, making this an ineffective method. These same problems occur with other techniques, such as those disclosed in U.S. Pat. No. 4,965,677, issued Oct. 23, 1990. This technique also assumes some sort of spatial correlation. In this instance, the spatial correlation needed is in the vertical dimension of the image.

An approach that does not necessarily rely upon spatial correlation can be found in U.S. Pat. No. 5,859,931, issued Jan. 12, 1999. It applies to halftoned images to which error diffusion has been applied and relies upon a limited number of neighboring pixels for prediction of dot values. The encoding is run-length encoding, which also serves to reduce its requirements for spatially correlated data. However, the approach used is extremely computationally intensive, requiring more time or a very powerful processor to perform its tasks.

None of the approaches neither above, nor similar examples, allow for efficient compression of halftoned images utilizing FM screens. In some instances, attempts to apply these techniques to image data actually result in an expansion rather than a compression of the image data. A need exists for a method that allows these images to be compressed and transferred across a network or stored with low bandwidth or memory requirements.

SUMMARY

One embodiment of the invention is a method for compression and decompression of halftoned images using the halftone screen. The compression method reduces an input binary image into a mean image, uses the halftone screen in combination with the mean image to produce a predicted image. The predicted image is then compared to the original image to produce a residue image. The residue image and the mean image are then compressed and either stored or transmitted. For decompression, the mean image and residue image are decompressed and then used with the halftone screen to arrive at a reconstructed binary image. A prediction process uses the mean image and scales it to a full-size image that has substantially similar dimensions as the original image. It then applies the halftone screen to the full-size image and produces a predicted image.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
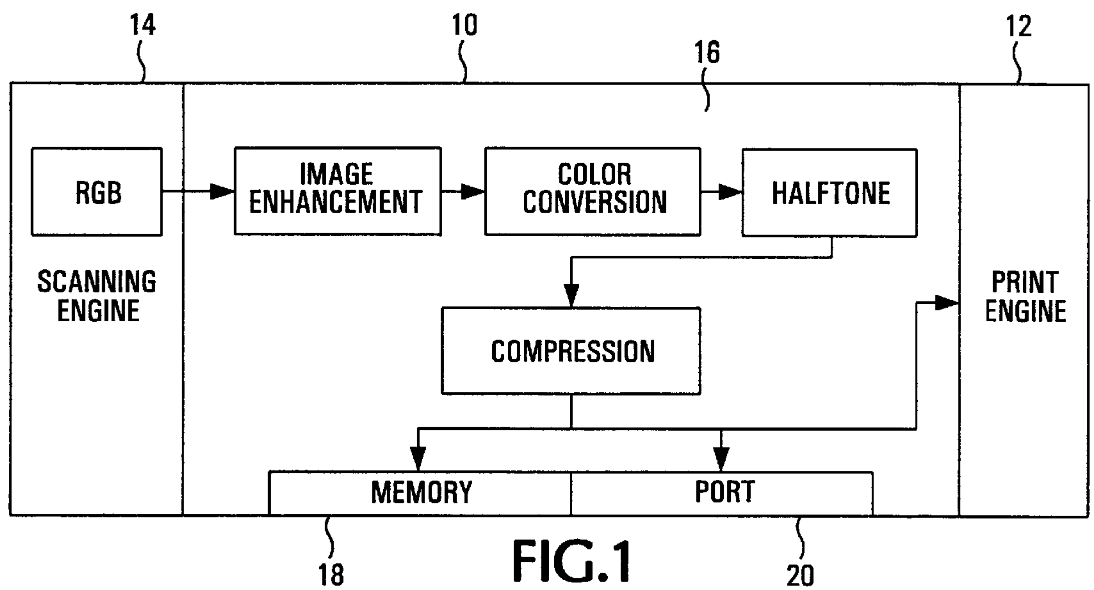
FIG. 1 shows a prior art block diagram of a digital image processing system.

FIG. 1 shows a block diagram of a prior art digital image processing system. The term image processing system as used here refers to those systems that print, scan, or print and scan digital images. These may include stand-alone printers, scanners, copiers, fax machines and multifunction peripherals that perform some or all of these functions.

The system 10 may have several components. For ease of discussion, the system 10 has been divided into four main components, a print engine 12, a scanning engine 14, a processing subsystem 16 and some type of memory 18. When the system stores or sends image data, the scanning engine 14 converts a document into image data. The processing subsystem 16 will then perform several functions upon it possibly including image enhancement, color conversion, halftoning and compression. Image enhancement typically improves the image received from the scanning engine. Color conversion from the Red-Green-Blue (RGB) data received from the scanner to Cyan-Magenta-Yellow-Black (CMYK) is typically necessary because most printers can only print out CMYK data.

The halftone process converts the CMYK data to binary printable data. Compression will reduce the amount of space needed to store the image, or reduce the amount of bandwidth needed for transmission. Most current compression processes use one-dimensional or two-dimensional context to predict the dot pattern, allowing the data to be compressed. This provides advantages for applications such as scan-once-print-many (SOPM), electronic recirculating document handlers (ERDH) and transmissions across a network or phone lines.

The system may also function as a printer. In this case, the processing subsystem 16 may receive the data from a port 20 or from the memory 18. The processing subsystem would then decompress the data into its binary printable form. The binary data is then sent to the print engine 12 and it produces a printed copy of the digital image. These functions may all be contained in one system, as shown. Alternatively, the scanning engine and the print engine may reside with dedicated processing subsystems for each in separate systems.

Figure 2A:
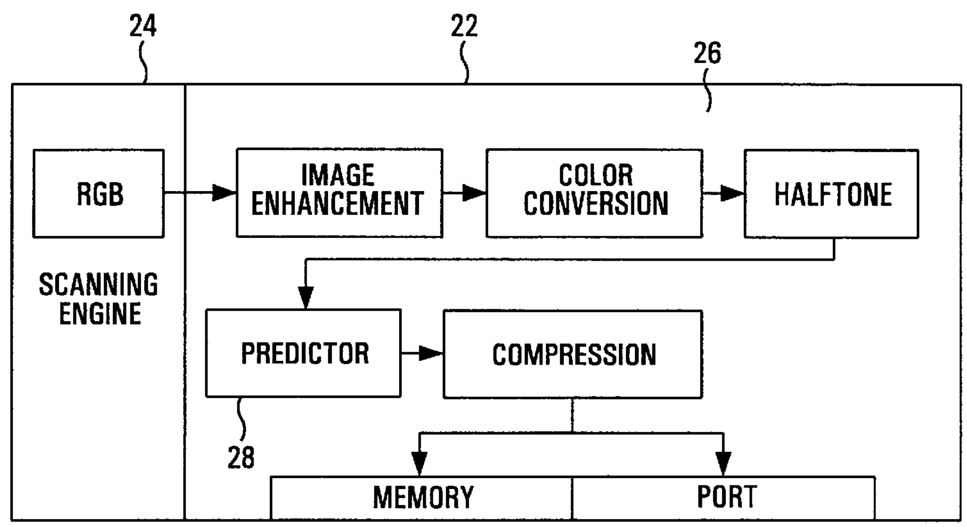
FIG. 2 shows a block diagram of one embodiment of a processing subsystem as part of a digital image processing system, in accordance with the invention.
Figure 2B:
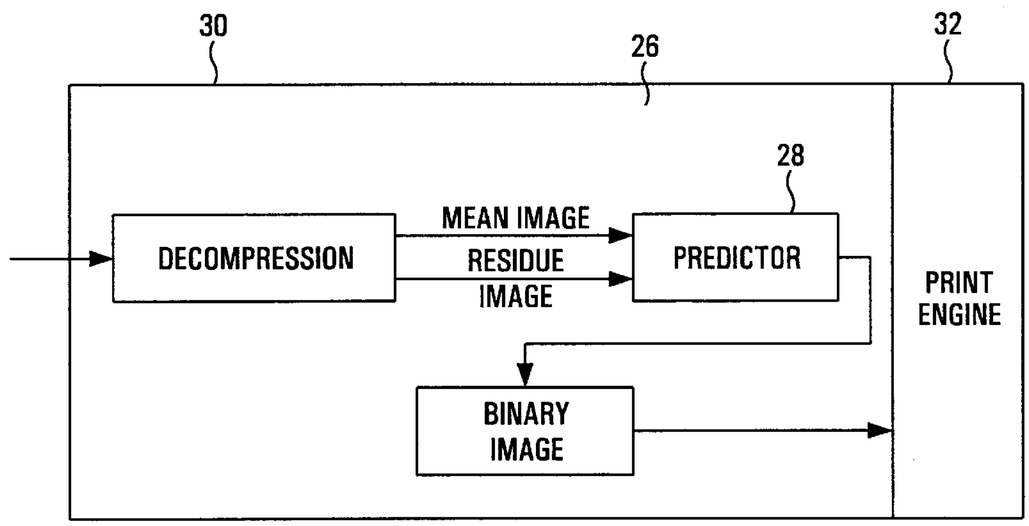

FIGS. 2*a* and 2*b* shows embodiments of separate processing subsystems for scanning and printing in accordance with the invention. FIG. 2*a* shows one embodiment of a processing subsystem for a scanning system. The scanning system 22 has a scanning engine 24 operable to create RGB data files from scanned images. Scan processing subsystem 26 performs image enhancement, color conversion and halftoning on the enhanced image data. The compression process is significantly different in this embodiment.

Prior to being compressed, a predictor 28 is used to generate two versions of the image, a mean image and a residue image. The production of these images will be discussed with reference to FIG. 3. Once these images are produced, they can be compressed and sent to storage or to a port for transmission. The mean image is a gray scale image, so it can be transmitted or stored without compression.

FIG. 2*b* shows one embodiment of a print system for receiving the compressed data from a system such as the scanning system shown in FIG. 2*a*. A decompressor receives the compressed data and decompresses it. The decompressed and residue images are then passed to the predictor 28. The predictor 28 will also receive the screen used to form the halftone image at the compression end. The predictor then produces the uncompressed, binary, printable version of the image, referred to here as the predicted image. The predicted image is then sent to the print engine 32 for production of the document. Document as used here will include any printed image on any type of substrate, such as paper.

As mentioned before, the systems shown in FIGS. 2*a* and 2*b* could form one system. In that instance, the predictor would be common to the two systems and the system would be configured in a similar fashion to the system in FIG. 1, with the added feature of the predictor among other things.

Figure 3:
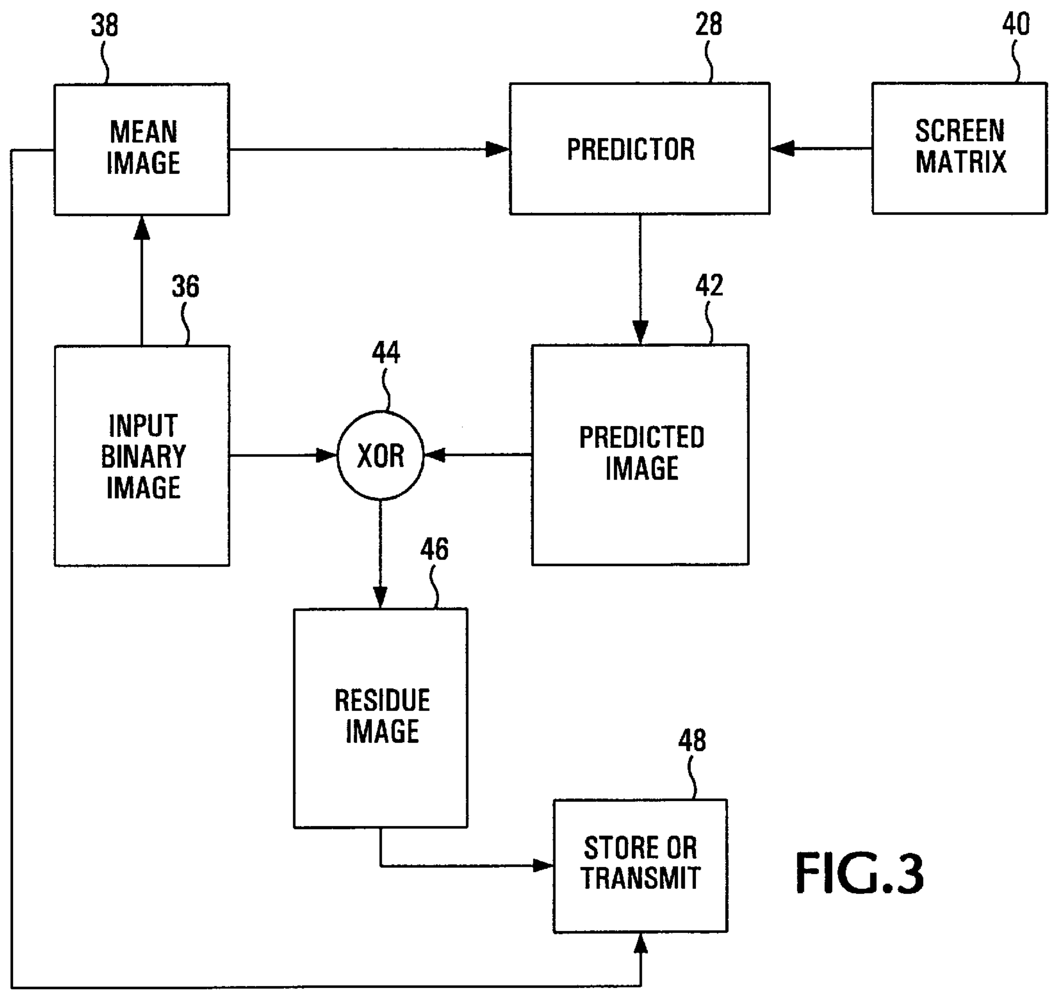
FIG. 3 shows a block diagram of one embodiment of a method to compress a screened binary image, in accordance with the invention.

FIG. 3 shows one embodiment of the predictor functioning in a compression process. The input binary image 36 is reduced to a mean image. The binary image has dimensions of M×N pixels. These are divided into smaller blocks B×B, where B can be 8, 16, 32, etc. The sum of the pixel values for each block is used to form the pixel value for the 'block' pixel in the mean image, resulting in a much smaller image. This smaller mean image 38 can be stored or transmitted with little overhead. The screen matrix 40 used in halftoning the image are used by the predictor 28 to produce a predicted image.

This is done by comparison of the pixel value for pixels in the mean image to the values in the screen matrix. For example, if the screen value is much higher than the mean level of the local neighborhood, that pixel will not likely turn on. If the screen value is much lower than the mean value of the local neighborhood, the pixel will likely turn on. The mean level of the local neighborhood from the original image is the sum computed in generating the mean image, so the mean image is used for the comparison.

The comparison performed at the predictor 28 results in a predicted image 42. The predicted image is then compared to the original by exclusively-or-ing (XOR-ing) the original image to the predicted image. Because of the nature of the XOR process, this will result in a matrix of 0s and 1s, where 1s indicate where the predicted image differs from the original image, documenting the errors in the predicted image. For example, if the predicted image has a value for a pixel to be a 1 and the original image value for that pixel is a 0, the result of the XOR process will be a 1. This will inform subsequent processes that the value in the predicted image is incorrect.

The matrix of values produced by this comparison will be referred to as a residue image 46. If the predicted image has a similar bit pattern to the original image, the residue image will be mostly zeros. This is very easy to compress using run-length encoding. The residue image and the mean image are compressed and either stored or transmitted at 48.

The information needed to reconstruct the images would be the decompressed mean and residue images and the halftone screen. In most applications, the halftone screen would be readily available. For example, in a copier the scanning engine will have the halftone screen already available as it was used to halftone the image received from the scanning system within the copier. In a printer, the halftone screen may be available if the data is received in CMYK non-halftoned form and halftoned prior to printing. Otherwise, the screen data could be sent along with the compressed images. However, application of the invention is especially useful in closed systems, such as copiers.

Figure 4:
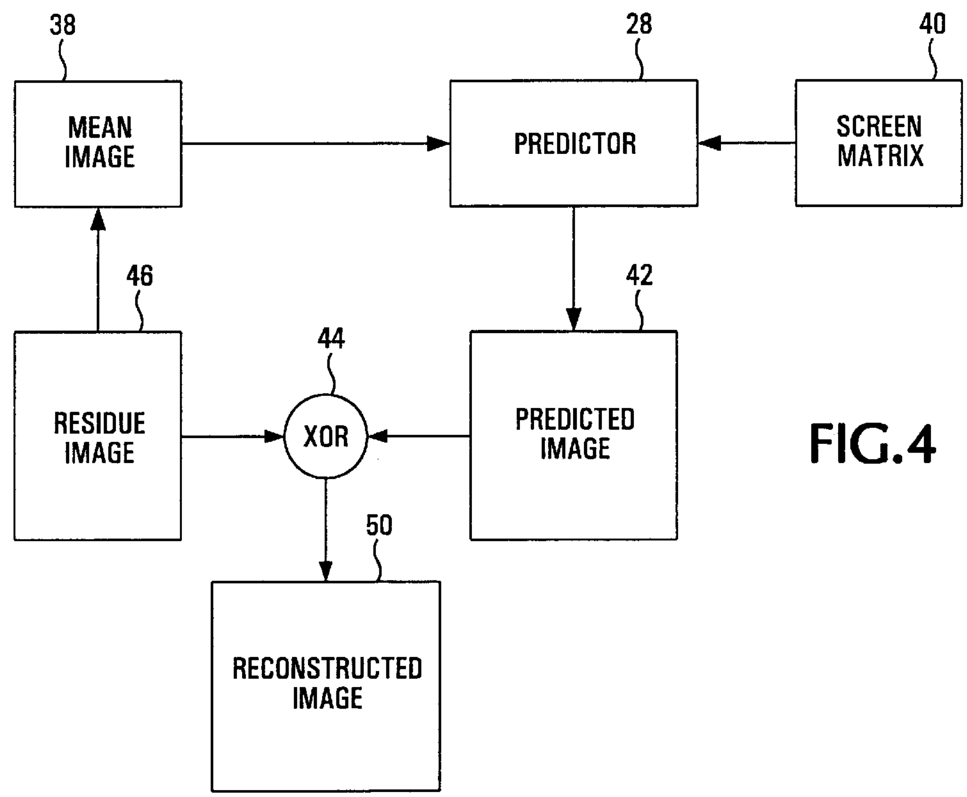
FIG. 4 shows a block diagram of one embodiment of a method to decompress a screened binary image, in accordance with the invention.

An embodiment of a method for decompressing an image that was compressed in a similar fashion to that shown in FIG. 3 is shown in FIG. 4. The mean image 38 and residue image 46 are received from a port or a memory, in compressed form. The residue image is decompressed/decoded using run-length decoding. The mean image and the screen matrix 40 are then provided to the predictor 28, which forms the predicted image. The predicted image and the residue image are then XOR-ed to arrive at the reconstructed binary image 50. The reconstructed binary image 50 is produced with a minimum of overhead and small storage/transmission size.

Figure 5:
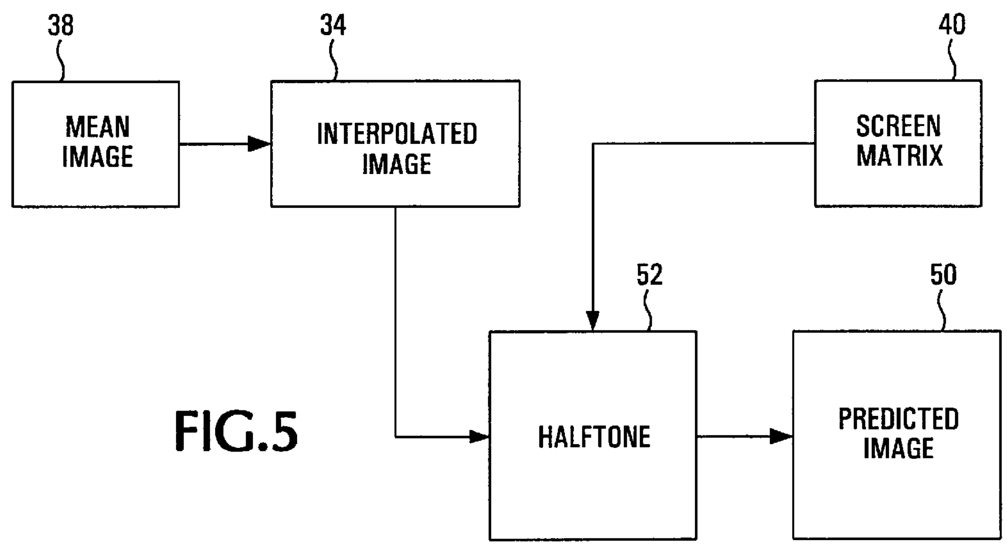
FIG. 5 shows one embodiment of a predictor as part of a digital image processing system, in accordance with the invention.

One of the important aspects of this process is the functioning of the predictor 28. A more detailed view of the predictor is shown in FIG. 5. The predictor takes the mean image 38 and scales it back to full size using linear interpolation or some similar interpolation method that produces an image of substantially similar dimensions as the original binary input image. The interpolated image 34 is then halftoned using the same screen 40 as was used in halftoning the original image at 52. The result is the predicted image 50, which then follows a process similar to that shown in the example of FIG. 4.

The methods of the invention would be provided to the user in software, although they could also be implemented in a Digital Signal Processor (DSP) or Application Specific Integrated Circuit (ASIC). The software would be distributed on some form of computer readable medium, such as a diskette, CD-ROM or downloadable file. The software code would then be executed by a computing device, such as the processing subsystem in any of the above embodiments, to perform the processes. The software could be included in a printer driver, with the halftone screen preloaded for both sides of the process. Additionally, it could be included in a fax machine or fax software.

In this manner, a low overhead, accurate method of compressing/encoding and decompressing/decoding images is provided. Knowledge of the halftone screen used in converting a continuous tone image into a binary printable image is capitalized upon. The resulting process can use binary images that have been halftoned with decorrelating screens such as an FM or blue-noise screen. The compression/decompression process no longer needs to rely upon neighborhood information to reconstruct the image.

Thus, although there has been described to this point a particular embodiment for a method and apparatus for compression and decompression of halftoned images, it is not intended that such specific references be considered as limitations upon the scope of this invention except in-so-far as set forth in the following claims.

What is claimed is:

1. A method of compressing a halftoned image, the method comprising:

a) dividing an input binary image into blocks;

b) determining the sum of each block, wherein the sums of each block are combined to form a mean image;

c) using the mean image and a halftone screen matrix to predict the input binary image, producing a predicted image;

d) comparing the predicted image with the binary image to produce a residue image; and e) compressing the residue image and the mean image for transfer through a network.

2. The method of claim 1 wherein the screen matrix is a frequency modulation screen.

3. The method of claim 1 wherein the screen matrix is a blue noise screen.

4. The method of claim 1 wherein the compression takes place in a stand-alone scanner.

5. The method of claim 1 wherein the compression takes place in a copier.

6. The method of claim 1 wherein the compression takes place in a fax machine.

7. A method of decompressing a halftoned image, the method comprising:

a) decompressing a mean image and a residue image from received image data;

b) forming a predicted image from the mean image and a halftone screen;

c) comparing the predicted image with the residue image to form a reconstructed binary image.

8. The method of claim 7, wherein forming a predicted image further comprises:

a) scaling the mean image to a full-size image; and b) applying the halftone screen to the full-size image, producing the predicted image.

9. The method of claim 8, wherein the scaling is performed using linear interpolation.

10. A computer-readable medium containing software code, the software code including instructions that, when executed, result in:

a) division of an input binary image into blocks;

b) summing each block and combining sums of each block to produce a mean image;

c) using a halftone screen matrix and the mean image to produce a predicted image;

d) comparing the predicted image and the input binary image to produce in a residue image; and e) compressing the residue image and the mean image.

11. The computer-readable medium of claim 10, wherein the medium further comprises a downloadable file.

12. The computer-readable medium of claim 10, wherein the medium further comprises a printer driver.

* * * * *